(12) United States Patent
Shmilovich et al.

(10) Patent No.: US 7,635,107 B2
(45) Date of Patent: Dec. 22, 2009

(54) SYSTEM FOR AERODYNAMIC FLOWS AND ASSOCIATED METHOD

(75) Inventors: Arvin Shmilovich, Huntington Beach, CA (US); Yoram Yadlin, Irvine, CA (US); Roger W. Clark, Huntington Beach, CA (US); David J. Manley, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 778 days.

(21) Appl. No.: 11/200,515

(22) Filed: Aug. 9, 2005

(65) Prior Publication Data

US 2007/0034746 A1 Feb. 15, 2007

(51) Int. Cl.
*B64C 21/04* (2006.01)
(52) U.S. Cl. ............................. 244/207; 244/208
(58) Field of Classification Search ............... 244/207, 244/208, 209, 204
See application file for complete search history.

(56) References Cited

U.S. PATENT DOCUMENTS

| | | | |
|---|---|---|---|
| 2,041,793 A | 5/1936 | Stalker | |
| 2,077,071 A | 4/1937 | Rose | |
| 2,078,854 A | 4/1937 | Jones | |
| 2,406,475 A | 8/1946 | Rogers | |
| 2,568,812 A | 9/1951 | Lee | |
| 3,887,146 A | 6/1975 | Bright | |
| 4,516,747 A | 5/1985 | Lurz | |
| 4,600,172 A | 7/1986 | Loth | |
| 4,664,345 A | 5/1987 | Lurz | |
| 4,863,118 A | 9/1989 | Stallings, Jr. et al. | |
| 5,348,256 A * | 9/1994 | Parikh | 244/208 |
| 5,755,408 A | 5/1998 | Schmidt et al. | |
| 5,758,823 A | 6/1998 | Glezer et al. | |
| 5,803,410 A | 9/1998 | Hwang | |
| 5,806,807 A | 9/1998 | Haney | |
| 5,806,808 A | 9/1998 | O'Neil | |
| 5,813,625 A | 9/1998 | Hassan et al. | |
| 5,938,404 A | 8/1999 | Domzalski et al. | |
| 5,957,413 A | 9/1999 | Glezer et al. | |
| 5,988,522 A | 11/1999 | Glezer et al. | |
| 6,079,671 A | 6/2000 | O'Neil et al. | |

(Continued)

FOREIGN PATENT DOCUMENTS

DE 584 585 9/1933

(Continued)

OTHER PUBLICATIONS

PCT Notification of Transmittal of the International Search Report and the Written Opinion of The International Searching Authority, or the Declaration, mailed Feb. 9, 2007 for PCT/US2006/029134 (Filed Jul. 26, 2006).

*Primary Examiner*—J. Woodrow Eldred
(74) *Attorney, Agent, or Firm*—Alston & Bird LLP

(57) ABSTRACT

A system and method for controlling boundary layer flow over an aircraft wing are provided. The system includes at least one wing element, and a plurality of ports defined in the wing element and in fluid communication with one another. The system also includes at least one fluidic device operable to continuously ingest the fluid through at least one of the ports and eject the fluid out of at least one other port to control boundary layer flow of the fluid over the wing element.

18 Claims, 10 Drawing Sheets

U.S. PATENT DOCUMENTS

| | | |
|---|---|---|
| 6,092,990 A | 7/2000 | Hassan et al. |
| 6,109,565 A | 8/2000 | King, Sr. |
| 6,109,566 A | 8/2000 | Miller et al. |
| 6,119,987 A | 9/2000 | Kiknadze et al. |
| 6,123,145 A | 9/2000 | Glezer et al. |
| 6,135,395 A | 10/2000 | Collett |
| 6,176,454 B1 | 1/2001 | Grosche et al. |
| 6,368,059 B1 | 4/2002 | Maines |
| 6,425,553 B1 | 7/2002 | Smith et al. |
| 6,457,654 B1 | 10/2002 | Glezer et al. |
| 6,471,477 B2 | 10/2002 | Hassan et al. |
| 6,554,607 B1 | 4/2003 | Glezer et al. |
| 6,629,674 B1 | 10/2003 | Saddoughi et al. |
| 6,644,598 B2 | 11/2003 | Glezer et al. |
| 6,722,581 B2 | 4/2004 | Saddoughi |
| 6,752,358 B1 | 6/2004 | Williams et al. |
| 6,796,533 B2 | 9/2004 | Barrett et al. |
| 6,899,302 B1 | 5/2005 | Hassan et al. |
| 6,905,092 B2 | 6/2005 | Somers |
| 6,994,297 B1 * | 2/2006 | Hassan et al. ............... 244/204 |
| 7,048,234 B2 | 5/2006 | Recksiek et al. |
| 7,255,309 B2 * | 8/2007 | Boldrin et al. .............. 244/208 |
| 2002/0190165 A1 | 12/2002 | Glezer et al. |
| 2003/0150962 A1 | 8/2003 | Orban |
| 2006/0022092 A1 | 2/2006 | Miller et al. |
| 2006/0102801 A1 * | 5/2006 | Manley ...................... 244/208 |

FOREIGN PATENT DOCUMENTS

| | | |
|---|---|---|
| DE | 699 066 | 11/1940 |
| DE | 197 47 308 | 7/1999 |
| EP | 0 052 242 | 5/1982 |

* cited by examiner

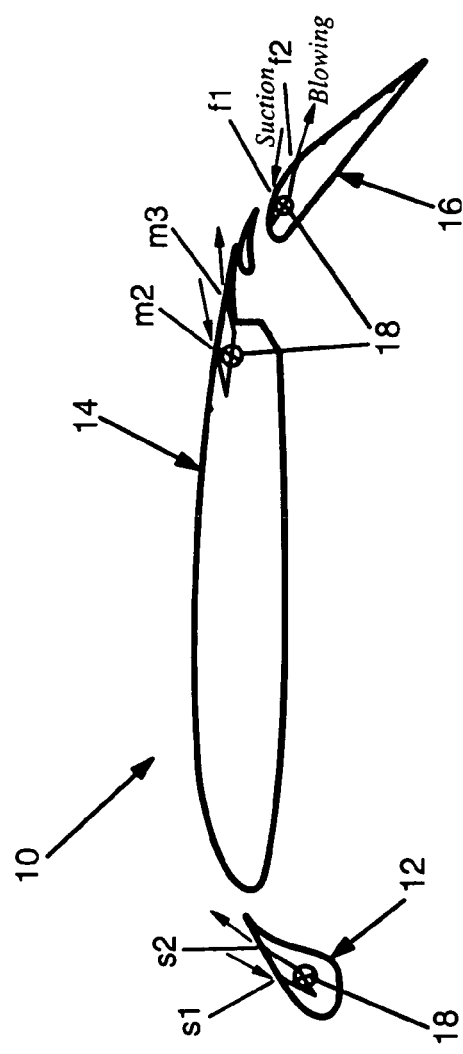
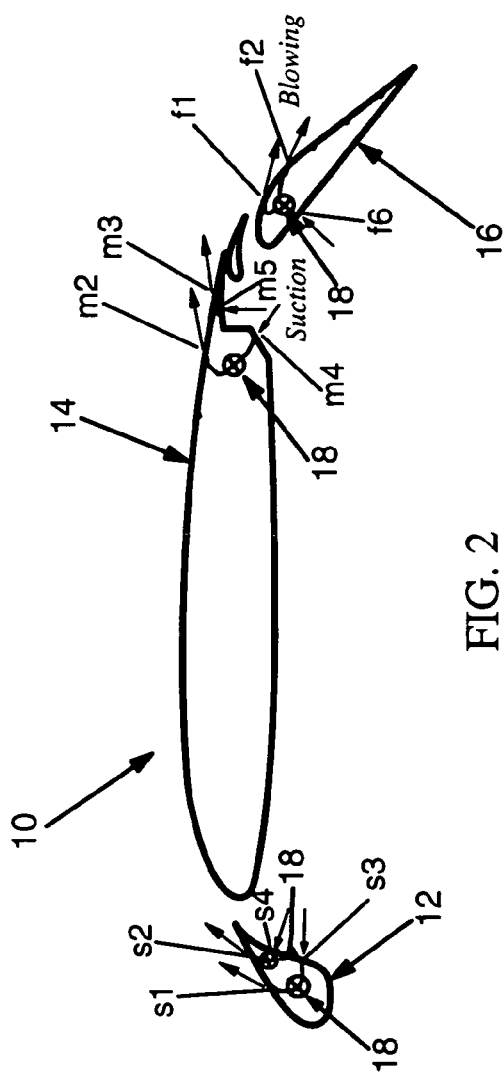
FIG. 1
FIG. 2

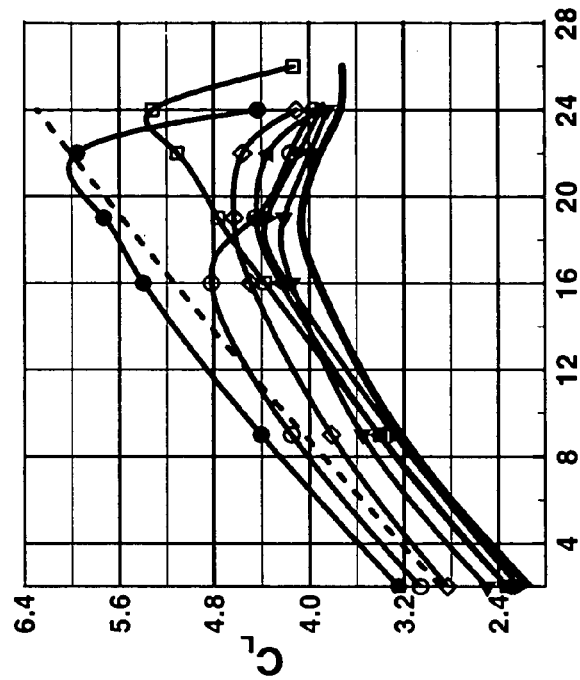
FIG. 5B
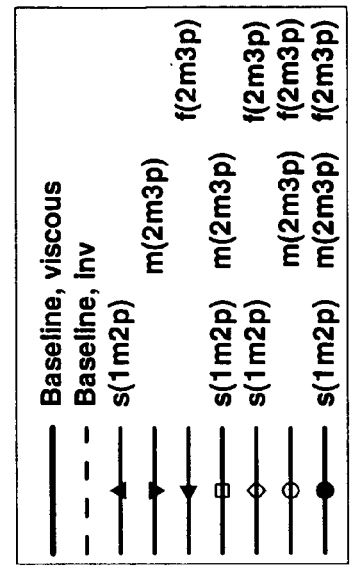
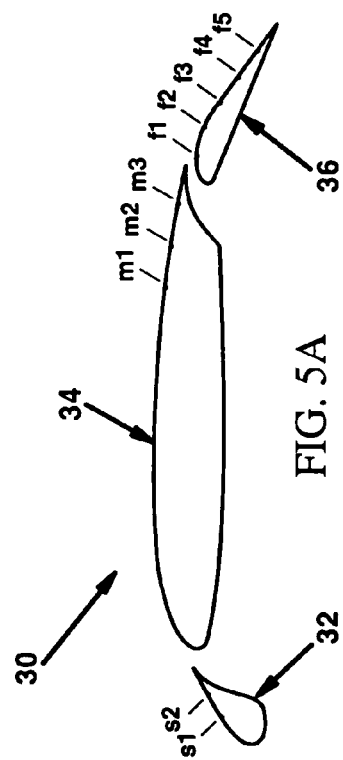
FIG. 5A
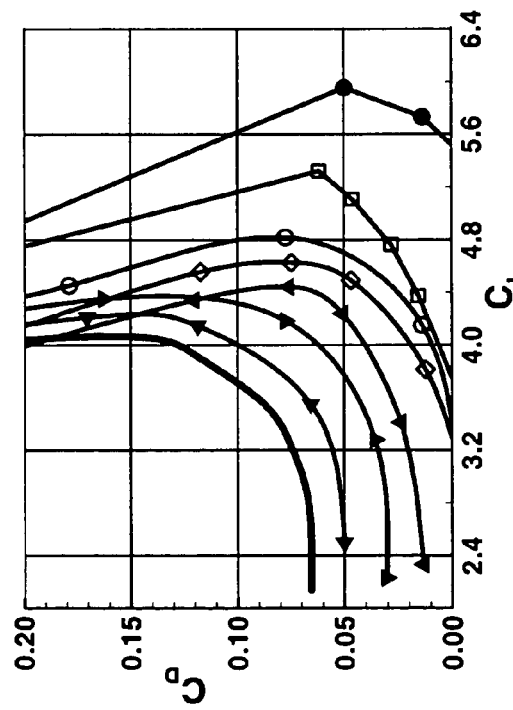
FIG. 5C

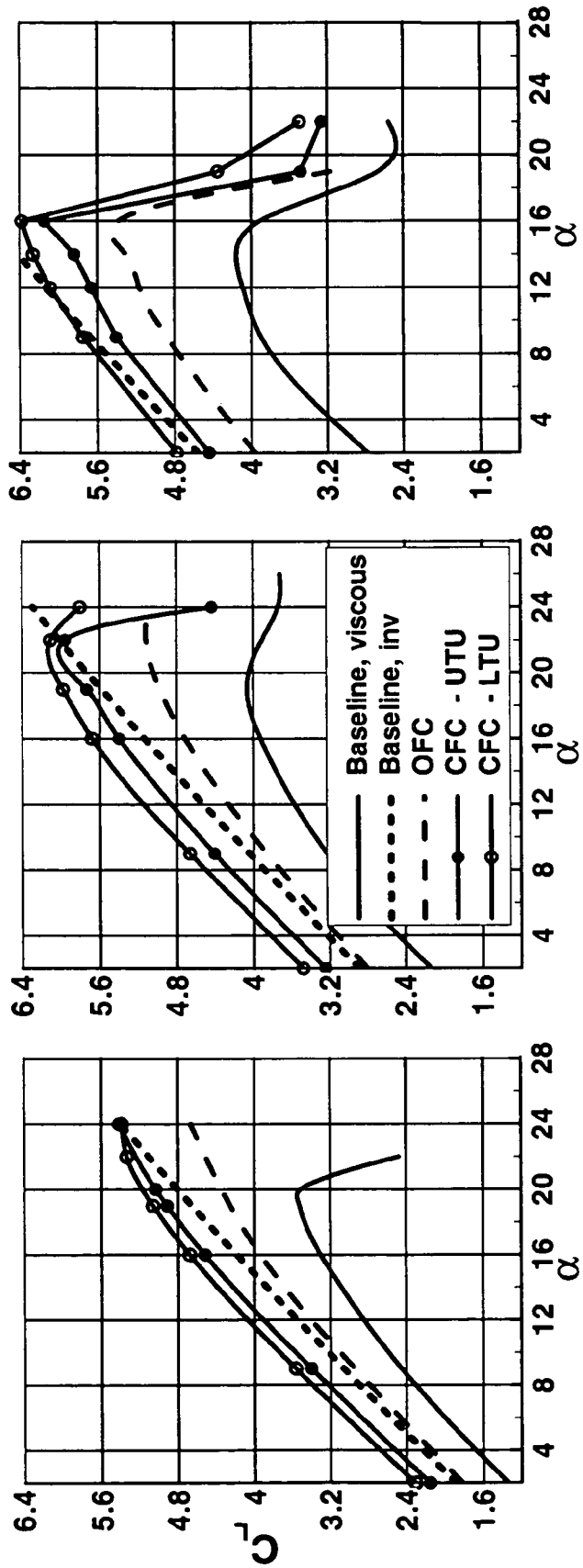

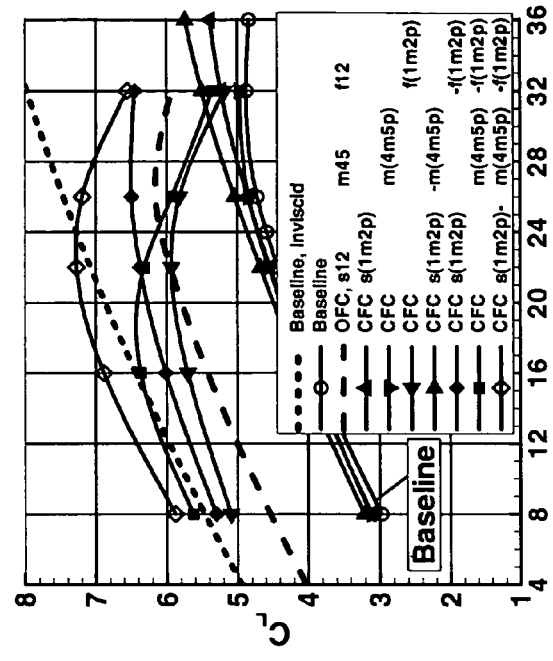
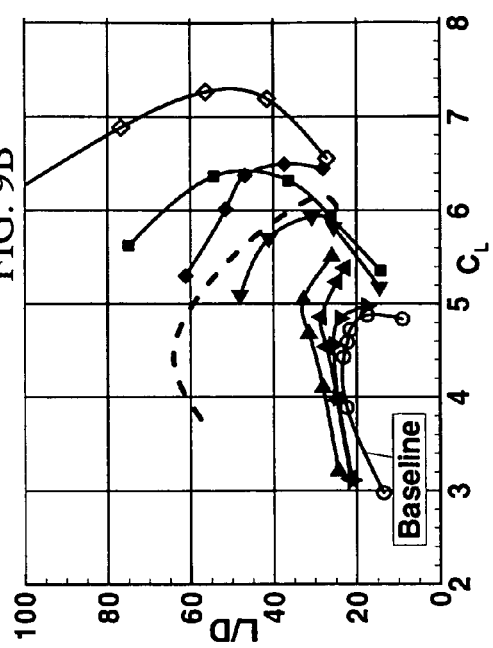
FIG. 9A
FIG. 9B
FIG. 9C
FIG. 9D

SYSTEM FOR AERODYNAMIC FLOWS AND ASSOCIATED METHOD

BACKGROUND OF THE INVENTION

1.) Field of the Invention

The present invention relates to a system for aerodynamic flows and, more particularly, to a system capable of controlling boundary layer flow over an aircraft wing.

2.) Description of Related Art

One of the design objectives of the aircraft designer is to ensure high aerodynamic performance over a range of flight conditions. The performance during take-off and landing is a principal design objective of transport aircraft where high-lift capability is a key requirement. Take-off and landing are especially challenging since the flows are dominated by viscous effects, which are the major determinant of aerodynamic performance, and the ability to alter the characteristics of the viscous flow is vital to the development of efficient high lift systems.

Techniques for altering the viscous flow structures are highly desirable due to the great potential for improved efficiency. A variety of fluidic actuators for manipulating viscous flows have been developed for a wide range of applications. These actuators provide oscillatory ejection and ingestion of fluid at various points on the wing surface. The great appeal of these devices is that they employ Zero-Net-Mass-Flow pulsation ("ZNMF"), i.e., no fluidic source is needed. The advantage of ZNMF is twofold: a high pressure container or bleed air from the engines (bleed reduces propulsion efficiency) is avoided, and a flow control system may be integrated without the need for complex plumbing.

Flow control systems that use oscillatory forcing may employ electrically driven fluidics or combustion powered devices. An electrical actuator uses a moving diaphragm or a piston to generate blowing/suction through an orifice, while a combustion actuator emits pulsed jets through an outlet. Generally, there are several types of electrical actuators: electromagnetic (or voice coil, like those used in speakers), electromechanical (piston driven), and piezo-electric (whereby a metallized diaphragm flexes when subjected to an electrical pulse).

For example, U.S. Pat. No. 5,988,522 to Glezer et al. discloses synthetic jet actuators for modifying the direction of fluid flow. The actuator includes a housing having an internal chamber, where a mechanism in the housing is utilized to periodically change the volume within the internal chamber so that a series of fluid vortices are generated and projected into an external environment out of the orifice. The mechanism may include a piston or diaphragm that is actuated by an electrical bias or piezoelectric element. The mechanism uses the working fluid where the actuator is being deployed such that linear momentum is transferred to the flow system without net mass injection into the system. In addition, a control system is utilized to oscillate the diaphragm so that a synthetic jet stream is propagated from the orifice.

Oscillatory fluidic actuators have proven quite effective for a variety of flow problems. However, several shortcomings associated with unsteady excitation must be solved before this technology is implemented into new flight worthy air vehicles. For example, oscillatory actuators are still in developmental stages, and their practicality and robustness require investigation for a realistic operational environment. In addition, pulsed excitation results in unsteady forces and moments with significant amplitudes, which is detrimental to structural integrity and has serious implications to structural fatigue. This is a particularly acute problem for a multi-element wing system where the slat and flap elements are deployed using systems of extendible linkages and tracks. The quality of boundary layer control due to unsteady force and moment excitation is also limited with oscillatory actuators. Furthermore, physical limitation of electrically driven actuators (diaphragm displacement, size of the orifice, and the size of the chamber) pose a limit on the maximum jet velocity and, thus, energy output. Combustion actuators produce higher jet velocity, but their energy output is also limited because of their small orifice. Although no air sources are required for combustion-powered actuators, these devices use combustible material that requires storage, supply lines, and firewalls within the airframe. Moreover, the potential hazard of combustion-based systems poses a major obstacle to market acceptance by aircraft operators and the general public.

It would therefore be advantageous to provide a system for controlling boundary layer flow over an aircraft wing. In addition, it would be advantageous to provide a system that improves aerodynamic performance of an aircraft wing. Moreover, it would be advantageous to provide a system that is easily employed with an aircraft wing for improving performance of an aircraft during take-off and landing.

BRIEF SUMMARY OF THE INVENTION

Embodiments of the present invention address the above needs and achieve other advantages by providing a system for controlling boundary layer flow over an aircraft wing. The system employs fluidic devices to regulate fluid flow through ports that are in fluid communication with one another. As such, the ports and fluidic devices may be located in various locations on the multi-element aircraft wing to continuously control the boundary layer flow over the wing and reduce viscous effects. Results of computational fluid dynamics have shown that continuously regulating a plurality of linked ports results in more streamlined flow with higher circulation and reduced viscous effects. The aerodynamic improvement produces higher lift coefficient $C_L$ and reduced drag coefficient $C_D$. Lift levels close to, and higher than, inviscid levels are achievable with this flow actuation.

In one embodiment of the present invention, a system for controlling boundary layer flow over an aircraft wing is provided. The system includes at least one wing element, and a plurality of ports defined in the wing element and in fluid communication with one another. The ports may be defined on an upper and/or lower surface of the wing element. In addition, at least one port may be defined in an aft portion of the wing element. The system also includes at least one fluidic device (e.g., an electrically powered pump) operable to continuously ingest the fluid through at least one of the ports and eject the fluid out of at least one other port to control boundary layer flow of the fluid over the wing element.

In various aspects of the present invention, the fluidic device employs zero net mass flow to regulate fluid flow through the ports. The fluidic device may be operable to actuate a plurality of ports such that fluid flows through each of the actuated ports simultaneously, as well as actuate a plurality of ports automatically or manually. The wing element may include a slat and a flap interconnected to a main wing element. The fluidic device may actuate a plurality of ports associated with the slat, main wing element, and/or flap.

Embodiments of the present invention also provide a method for controlling boundary layer flow of a fluid over an aircraft wing. The method includes initiating fluid flow over an aircraft wing comprising at least one wing element, and continuously regulating fluid flow over the aircraft wing by ingesting and ejecting fluid through a plurality of ports defined in each wing element to control boundary layer flow of the fluid over the wing element. Initiating fluid flow could include commencing take-off or landing of the aircraft such that the onset of flow over the wing element is initiated.

In aspects of the method, the regulating step includes actuating a fluidic device associated with a plurality of ports that are in fluid communication with one another. The regulating step could also include regulating a plurality of ports simultaneously, and/or ingesting and ejecting the fluid through a pair of ports defined in an upper surface of the wing element. Similarly, the regulating step could include ingesting the fluid through a port defined in a lower surface of the wing element and ejecting the fluid through a port defined in an upper surface of the wing element. Furthermore, the regulating step may include ingesting the fluid through a port defined in an upper surface of the wing element and ejecting the fluid through a port defined in a lower surface of the wing element. The regulating step could include ingesting and ejecting fluid through a plurality of ports defined in a plurality of wing elements, such as a slat, main wing element, and a flap.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a cross-sectional view of a multi-element aircraft wing according to one embodiment of the present invention;

FIG. 2 is a cross-sectional view of a multi-element aircraft wing according to another embodiment of the present invention;

FIG. 5A is a cross-sectional view of a multi-element aircraft wing according to another embodiment of the present invention;

FIGS. 5B-5C are graphical images depicting various aerodynamic properties of the multi-element aircraft wing shown in FIG. 5A;

FIGS. 6A-6C are graphical images illustrating coefficient of lift versus angle of attack for various flap deflections for takeoff and landing of multi-element aircraft wings according to one embodiment of the present invention;

FIG. 9A is a cross-sectional view of a multi-element aircraft wing according to another embodiment of the present invention;

FIGS. 9B-9D are graphical images depicting various aerodynamic properties of the multi-element aircraft wing shown in FIG. 9A;

DETAILED DESCRIPTION OF THE INVENTION

Figure 3:
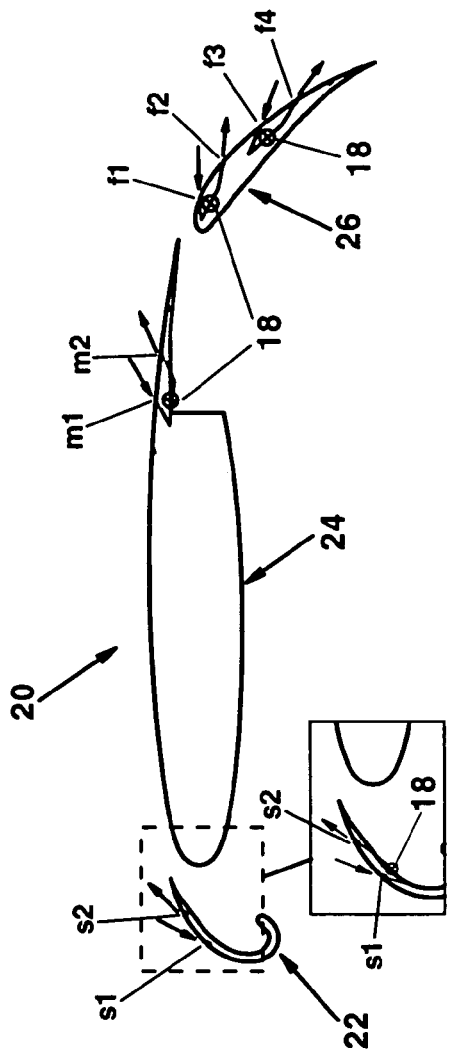
FIG. 3 is a cross-sectional view of a multi-element aircraft wing according to another embodiment of the present invention.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular to FIG. 1, there is shown a system for controlling the boundary layer flow over a multi-element aircraft wing 10. The aircraft wing 10 generally includes a plurality of wing elements 12, 14, and 16. Each of the wing elements 12, 14, and 16 includes a plurality of ports defined therein. Fluidic devices 18 are utilized to regulate the flow of fluid into and out of the ports to control boundary layer flow over each of the wing elements 12, 14, and 16. Generally, the fluidic devices are selectively operable to control the fluid flow through the ports during take-off and landing to improve the performance of the aircraft wing 10. As such, the aerodynamic properties, and particularly lift, of the aircraft wing 10 may be improved over a range of angles of attack and under various flight conditions.

The multi-element aircraft wing 10, or airfoil, typically includes a plurality of wing elements, namely, a slat 12, a main wing element 14, and a flap 16. Moreover, each of the slat 12, main wing element 14, and flap 16 includes one or more ports for controlling the boundary layer along the surface of the multi-element wing 10. For an exemplary description of multi-element aircraft wings and ports defined therein, see U.S. patent application Ser. No. 11/200,506, entitled "Lift Augmentation System and Associated Method," filed concurrently herewith, which is assigned to the present assignee and incorporated herein by reference. However, although reference is made herein to a multi-element aircraft wing, it is understood that in additional embodiments of the present invention, an aircraft wing including a single wing element may be employed if desired. Furthermore, it is understood that flow may be regulated by a plurality of ports and fluidic devices over any number of lifting surfaces in order to improve aerodynamic performance. For example, ports may be defined in a tail, rudder, fuselage body, helicopter blade, or other aerodynamic body.

FIG. 1 illustrates a multi-element aircraft wing having a slat 12 that includes a pair of ports s1 and s2, a main wing element 14 that includes a pair of ports m2, and m3, and a flap 16 that includes a pair of ports f1 and f2. Each of the ports is defined in an upper surface of a respective slat 12, main wing element 14, and flap 16. However, as shown in FIG. 2, the ports could be defined on both the upper and lower surfaces of the aircraft wing 10 at various positions on the aircraft wing. Thus, ports s3-s4, m4-m5, and f6 are defined in a lower surface of a respective wing element. The ports are generally defined to extend into a respective slat 12, main wing element 14, or flap 16 such that fluid may be ingested or ejected through the ports. Moreover, pairs of ports defined in a respective slat 12, main wing element 14, and flap 16 may be interconnected and in fluid communication with one another such that one port may facilitate fluid flow into the port, while a second port facilitates flow out of the port. However, there may be various numbers of ports in fluid communication with one another. For instance, referring to FIG. 2 one port f6 defined on a lower surface of the flap 16 may be in fluid communication with a pair of ports f1-f2 defined on an upper surface of the flap. Typically the ports s1-s2 and m2-m3 are defined in an aft portion of respective slat 12 and main wing element 14, however, the ports could be defined in various wing elements and at various locations on the slat, main wing element, or flap 16 to achieve desired aerodynamic properties. For example, ports could be defined proximate to a leading edge of the main wing element 14 or in one or more of the slat 12, main wing element, and flap 16. Furthermore, although cross-sectional views of the multi-element aircraft wing 10 are shown, it is understood that ports may be defined in various spanwise configurations along the wing (e.g., aligned, staggered, non-aligned, etc.).

Figure 4:
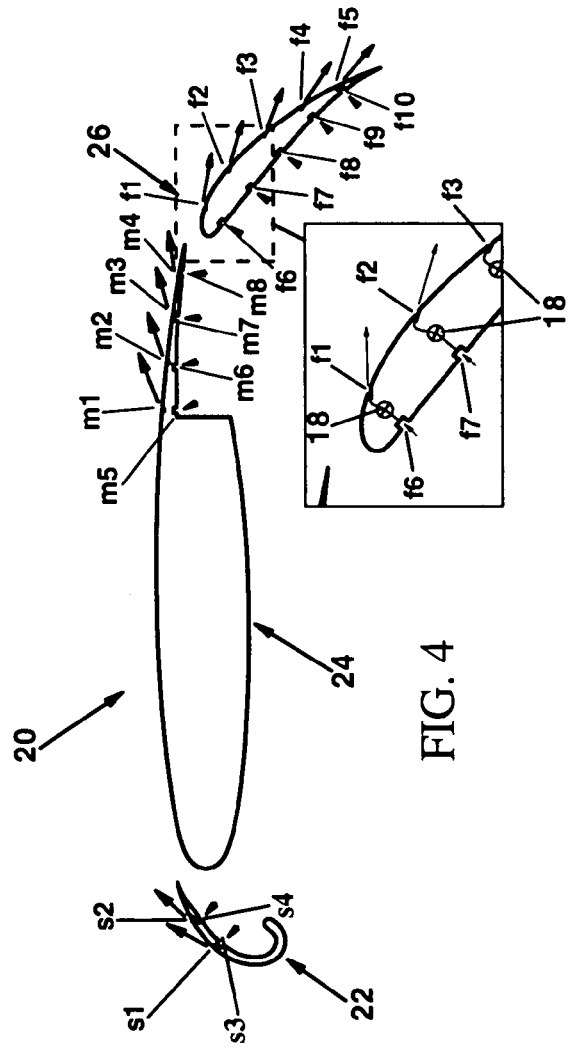
FIG. 4 is a cross-sectional view of a multi-element aircraft wing according to another embodiment of the present invention.

FIGS. 3 and 4 depict further aspects of the present invention, wherein a Kruger slat 22 is employed. FIG. 3 shows that the Krueger slat 22 includes ports s1 and s2, the main wing element 24 includes ports m1 and m2, and the flap 26 includes ports f1, f2, f3, and f4. Each of the ports shown in FIG. 3 is defined in an upper surface of the multi-element aircraft wing 20. FIG. 4 demonstrates that ports may be defined in both the upper and lower surfaces of the aircraft wing 20. As such, the Krueger slat 22 includes ports s1-s2 defined in an upper surface of the slat, while ports s3-s4 are defined in a lower surface of the slat. Similarly, the main wing element 24 includes upper m1-m4 and lower m5-m8 ports, while the flap 26 includes upper f1-f5 and lower f6-f10 ports. Therefore, there may be various configurations of aircraft wings and linked ports defined in the aircraft wing to achieve desired aerodynamic properties.

A plurality of fluidic devices 18 are employed to regulate fluid flow into or out of the ports. The fluidic devices 18 typically employ zero net mass flow (i.e., no external fluid source is required) to regulate fluid flow through the ports and may use various types of mechanisms to actuate one or more ports. Typically, an electrically powered pump is employed to continuously ingest (i.e., suck) and eject (i.e., blow) fluid through at least a pair of ports that are in fluid communication with one another to affect the boundary layer flow over a multi-element aircraft wing. However, other constant flow devices may be used if desired, for ingesting and ejecting fluid through the ports. Additionally, several ports may be actuated simultaneously.

Moreover, the fluidic devices 18 are capable of actuating ports associated with the slat, main wing element, and/or flap to achieve synergistic control of fluid flow over the aircraft wing to achieve higher lift levels. FIGS. 3 and 4 illustrate that a fluidic device 18 is associated with a pair of ports in each of the wing elements. However, the fluidic devices 18 may selectively actuate any number of ports to realize increased gains in aerodynamic performance of the aircraft wing. The ports are generally actuated during take-off or landing of an aircraft, where high lift is desirable. In addition, fluid flow through respective ports is typically continuous during take-off and landing (i.e., constant ingestion and ejection of fluid), although ports could be selectively regulated during take-off and landing to achieve oscillatory fluid flow if desired. Fluid is generally ejected through a respective port in the general direction of fluid flow, although the fluid could be ejected in various directions such as adjacent or perpendicular to a respective slat, main wing element, or flap or in a direction opposing the direction of fluid flow. Additionally, fluid may be ingested on a lower surface of the aircraft wing and ejected on an upper surface of the wing, ingested and ejected on the upper or lower surfaces of the wing, or ingested on an upper surface of the wing and ejected on a lower surface of the wing to affect the aerodynamic performance of the wing. Moreover, the fluidic devices may operate in conjunction with a feedback system such that the ports may be actuated automatically. For instance, sensors on the aircraft wing could provide information relating to various aerodynamic properties indicative of the fluid flowing over the wing such that particular ports may be actuated based on the information to improve aerodynamic performance. However, the fluidic devices may be operated manually such that the ports are actuated when desired or at predetermined flight conditions, such as during take-off or landing.

FIG. 5A illustrates a multi-element aircraft wing 30 including ports defined in each of a slat 32, main wing element 34, and flap 36. The slat 32 includes ports s1-s2, the main wing element 34 includes ports m1-m3, and the flap 36 includes ports f1-f5. FIGS. 5B-5D provide graphs depicting various aerodynamic properties for the multi-element aircraft wing 30. For purposes of simulating take-off conditions, the slat 22 is extended, and the flap is deflected at $\delta = 24°$.

FIG. 5B shows a lift coefficient, $C_L$, plotted against an angle of attack, $\alpha$, for inviscid flow, the viscous flow over a baseline multi-element aircraft wing (i.e., no ports actuated), and the viscous flow over the multi-element aircraft wing with various ports associated with the slat 32, main wing element 34, and flap 36 actuated. The following convention is used to identify actuation patterns: the numerals indicate the port number and minus ("m") and plus ("p") denote ingestion and ejection, respectively. For example, s(1m2p), m(2m3p), and f(2m3p) describe an upper surface actuator for each of the slat 32, main wing element 34, and flap 36, where f(2m3p) designates a flap actuator having suction at port 2 and blowing at port 3.

As shown in FIG. 5B, actuating the ports in the slat 32, main wing element 34, and/or flap 36 provides higher $C_L$ above an angle of attack of about 9° than the baseline multi-element aircraft wing with no ports actuated. In addition, actuating ports s(1m2p), m(2m3p), and f(2m3p) provides the greatest increase in $C_{LMax}$ (~6.0) and results in higher than inviscid lift up to an angle of attack of about 22°. Actuating ports m(2m3p) and f(2m3p) results in lift approximately matching the inviscid level up to an angle of attack of about 12°. FIG. 5C (drag polar) also illustrates that actuating the ports in the slat 32, main wing element 34, and/or flap 36 generally results in lower drag in comparison to the baseline wing for a given lift level. Thus, actuating ports in the multi-element aircraft wing 30 results in an increased $C_L$ in comparison to the baseline aircraft wing for almost the entire range of coefficient of drag ($C_D$). As described above, increasing $C_{Lmax}$, i.e., the maximum attainable value of $C_L$, will decrease the stall speed thereby facilitating shorter take-off and landing distances. Moreover, payload capacity may be increased.

The simulations illustrated in FIGS. 5B and 5C indicate that the aerodynamic performance can be significantly affected by the mode of actuation. In particular, in the linear portion of the lift curve shown in FIG. 5B, separate actuation of the ports associated with each of the slat 32, main wing element 34, or flap 36 results in modest improvements in aerodynamic performance. However, combining actuation patterns in each of the slat 32, main wing element 34, and flap 36 is most effective at reaching or exceeding inviscid levels. Generally, achieving lift levels beyond inviscid levels can be obtained depending on the net momentum addition provided by the fluidic devices.

FIGS. 6A-6C illustrate lift (i.e., $C_L$) obtained with ingestion and ejection occurring on the upper surface of a multi-element aircraft wing ("UTU" denotes Upper-surface-To-Upper-surface) and ingestion on a lower surface and ejection on the upper surface of a multi-element aircraft wing ("LTU" denotes Lower-surface-To-Upper-surface). The UTU configuration includes actuating three ports s(1m2p), m(2m3p), and f(2m3p), while the LTU configuration includes actuating a set of six upper and lower ports where blowing ports are denoted by s(1p2p), m(2p3p), and f(2p3p). During actuation of the LTU configuration, fluidic devices ingest air through the suction port located on the lower surface of the wing and eject air through respective discharge port on the upper surface of the wing. Moreover, FIGS. 6A-6C plot the UTU and LTU configurations on the same graph as a baseline aircraft wing with no ports actuated, inviscid flow, and oscillatory actuation (i.e., actuating individual ports). FIG. 6A corresponds to a take-off configuration (flap angle δ=13°), FIG. 6B corresponds to another take-off configuration (δ=24°), and FIG. 6C corresponds to a landing configuration (δ=40°).

FIGS. 6A-6C demonstrate that using the UTU and LTU configurations in conjunction with constant fluid flow results in an increased $C_L$ in comparison to the oscillatory flow control ("OFC") and baseline configurations. Both the UTU and LTU configurations also produce lift higher than inviscid levels for angles of attack below about 24° for δ=13° and below about 22° for δ=24°. Also, the OFC configuration achieved about 50-60% of $C_{Lmax}$ over the baseline wing in comparison to the $C_{Lmax}$ of the LTU configuration. Furthermore, the LTU configuration performed slightly better than the UTU configuration. Utilizing an LTU configuration is desirable given its reduced power requirements resulting from the negative upper-to-lower surface pressure differential (i.e., from a high pressure region to a low pressure region). The simulations illustrate that not only is inviscid lift level achievable, but it may even be surpassed when predetermined ports are actuated and fluid flow is constant therethrough.

Figures 7A, 7B:
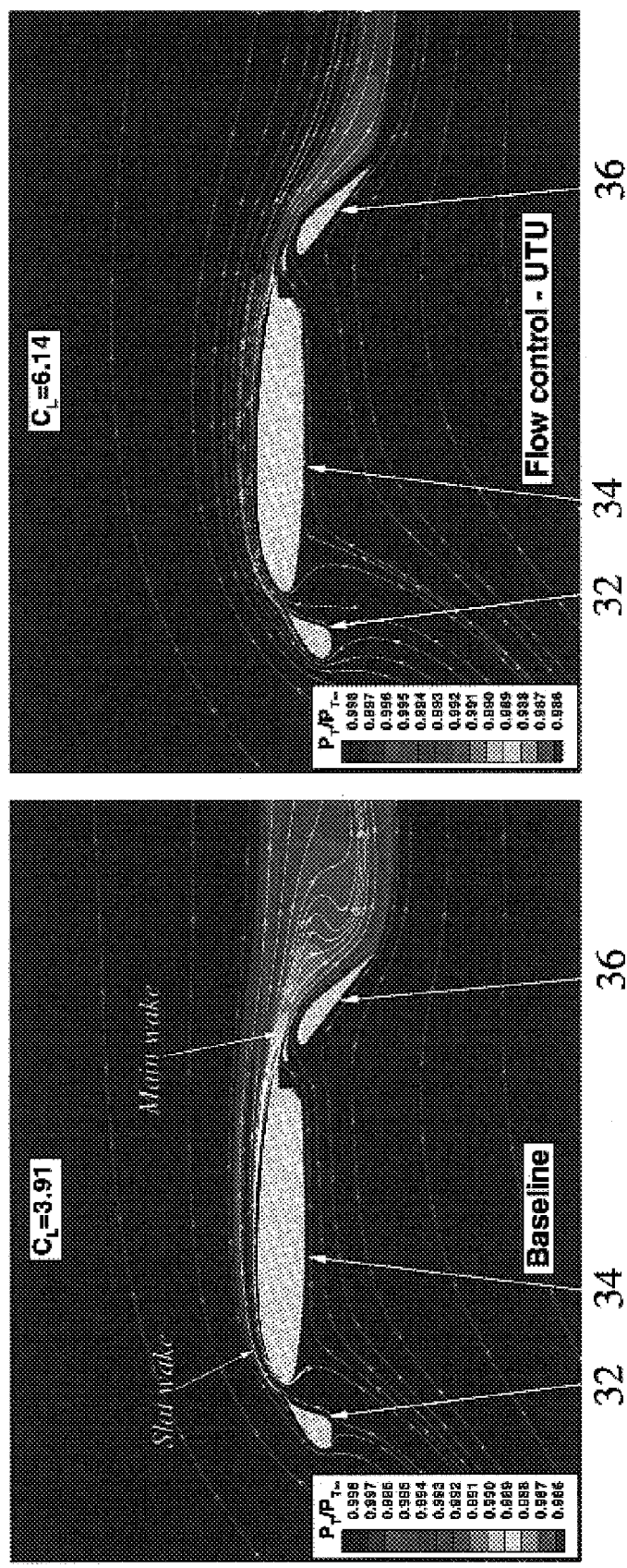
FIG. 7A is an image illustrating a total pressure field over a baseline multi-element aircraft wing without flow actuation.
FIG. 7B is an image illustrating a total pressure field over a multi-element aircraft wing according to one embodiment of the present invention.
Figure 8B:
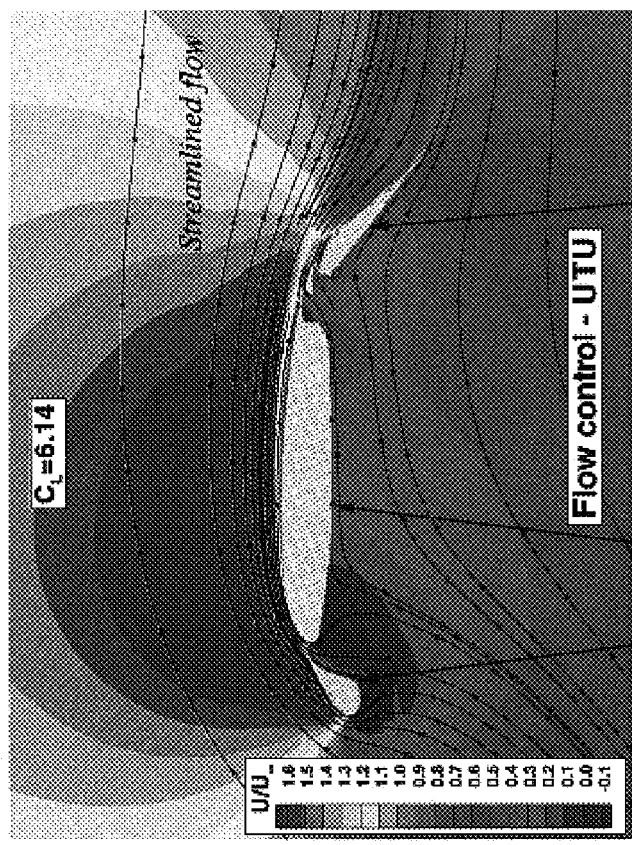
FIG. 8B is an image illustrating a streamwise velocity field over a multi-element aircraft wing according to one embodiment of the present invention.
Figure 8A:
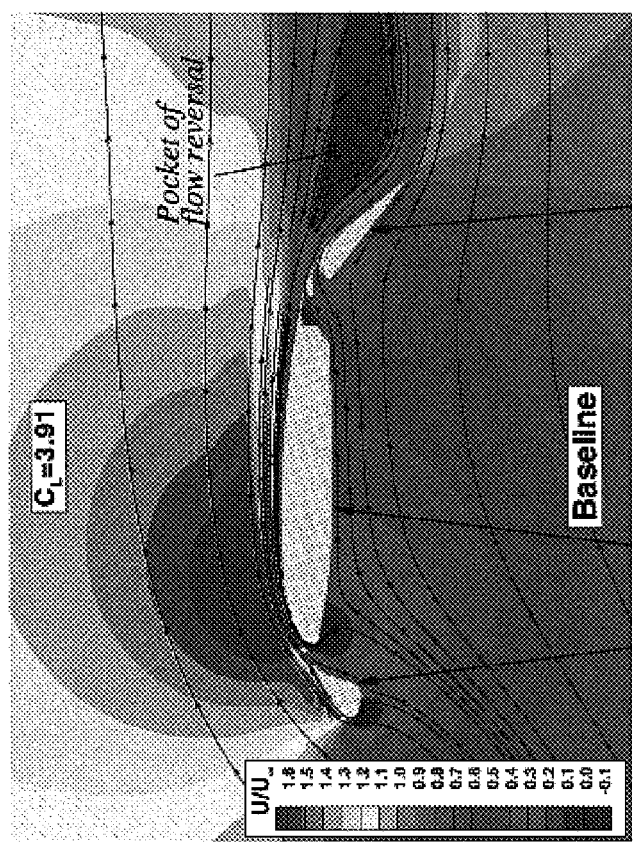
FIG. 8A is an image illustrating a streamwise velocity field over a baseline multi-element aircraft wing.

FIGS. 7A and 7B depict the total pressure field over a multi-element aircraft wing for the baseline and flow control cases in FIG. 6C, where the actuation is provided according to UTU s(1m2p), m(2m3p), and f(2m3p). The images illustrate the flowfields for the flap deflection of 40° and a 16° angle of attack. The baseline case results in a $C_L$ of about 3.91 while the actuation produces 6.14. FIG. 7A illustrates that without flow control, the flow is not efficient, i.e., the viscous layers and the wakes associated with the individual wing elements are quite sizeable with large total pressure losses. In contrast, FIG. 7B demonstrates that the actuation results in narrower viscous layers with reduced total pressure losses and more streamlined flow over the multi-element aircraft wing 30. As a result, a larger turning angle is defined in the wake of the aircraft wing, which increases lift, and flow reversal is reduced, if not eliminated. Furthermore, FIG. 8B also illustrates a more streamlined velocity component by actuating the ports associated with the aircraft wing. The slat wake shown in FIG. 8B is narrower than the wake shown in FIG. 8A, and the velocity defect is reduced. Flow reversal is also significantly reduced, if not eliminated, in the wake of the flap 36, while lift is also increased as shown by the higher suction level on the upper surface. As a result of the streamlined wake of the slat 32, the flow quality on the main wing element 34 and the flap 36 is improved, where flow reversal no longer occurs.

FIG. 9A depicts a multi-element aircraft wing 40 according to another embodiment of the present invention. The multi-element aircraft wing 40 includes a Krueger slat 42, a main wing element 44, and a flap 46 deflected at 50°. The flap 46 is deflected 50° to represent landing conditions in which flow is separated over most of the flap even at low angles of attack. Moreover, the slat 42 includes ports s1-s2, the main wing element 44 includes ports m1-m5, and the flap 46 includes ports f1-f5. As before, FIG. 9B demonstrates that selectively actuating ports m(4m5p) and f(1m2p), s(1m2p) and f(1m2p), or ports s(1m2p), m(4m5p), and f(1m2p) results in increased $C_L$ in comparison to both the baseline configuration (i.e., no ports actuated) and the oscillatory actuation OFC. In general, actuating ports in each of the wing elements of the multi-element aircraft wing 30 exceeds inviscid levels at angles of attack less than about 24° and achieves a significantly higher $C_{Lmax}$ (~7.3) than the baseline aircraft wing. Moreover, FIG. 9B shows that constant fluid flow through the ports results in a greater $C_L$ than oscillatory fluid flow ($C_{Lmax}$~6.2). Moreover, FIGS. 9C-9D demonstrate reduced drag and increased L/D for a given lift coefficient when the same combination of ports are actuated versus individually actuating ports, employing oscillatory fluid flow, or the baseline wing with no actuation. Moreover, actuating ports in the multi-element aircraft wing 40 results in an increased $C_L$ in comparison to the baseline aircraft wing for a given coefficient of drag ($C_D$).

Figure 10:
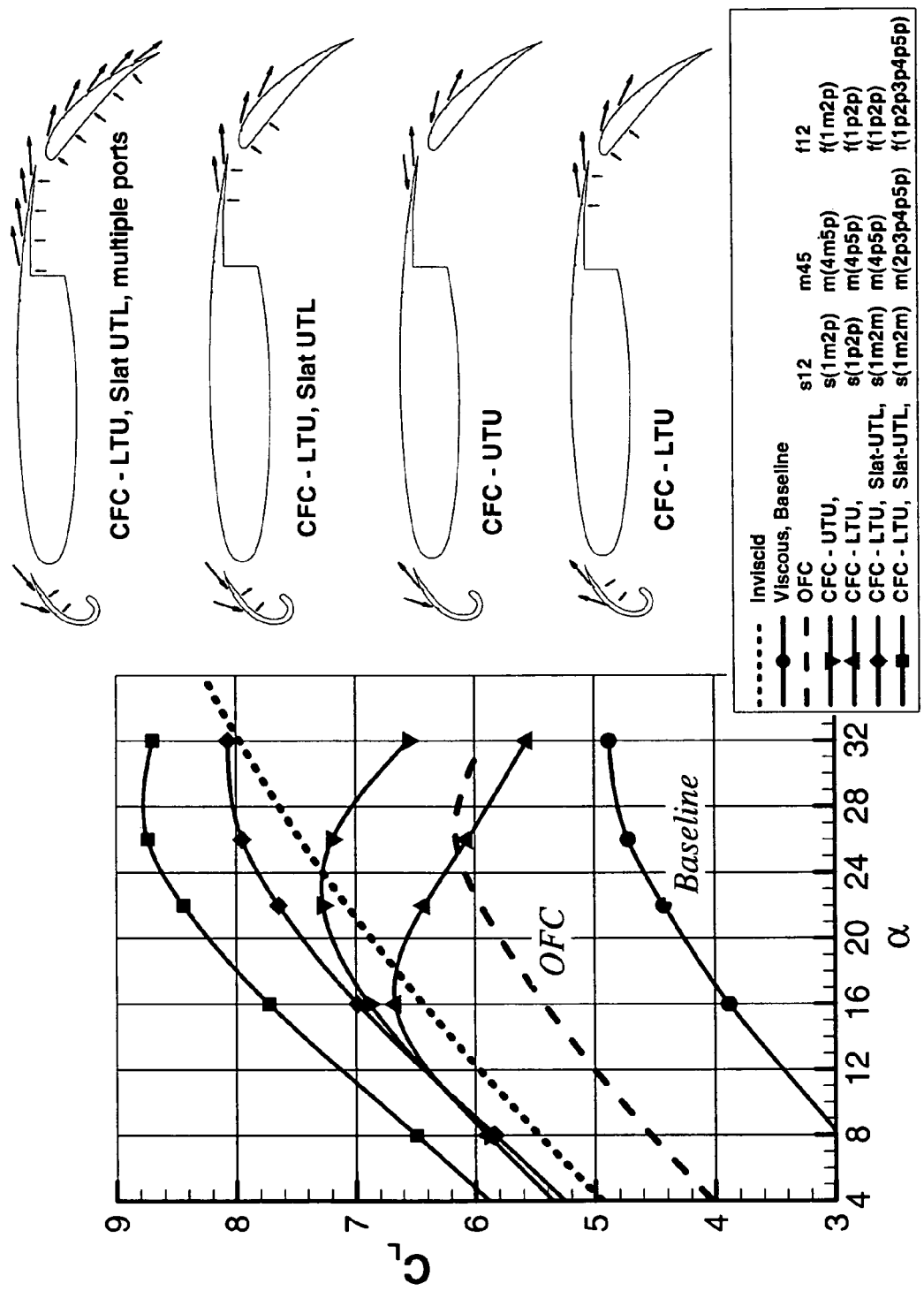
FIG. 10 is a graphical image illustrating a coefficient of lift versus an angle of attack for various flow actuation modes of a multi-element aircraft wing according to one embodiment of the present invention.

FIG. 10 depicts a graphical illustration of $C_L$ versus angle of attack for various configurations of ports actuated for a multi-element aircraft wing employing a Krueger slat and flap deflection of 50°. As shown, actuating multiple ports in each of the slat, main wing element, and flap (s(1m2m), m(2p3p4p5p), and f(1p2p3p4p5p)) and using a LTU configuration for the main wing element and flap and an Upper-surface-To-Lower-surface ("UTL") configuration for the slat results in the highest $C_{Lmax}$ (~8.7) and performs above inviscid levels for the angles of attack up to at least about 32°. Moreover, actuating a pair of ports in each of the slat, main wing element, and flap and using either the LTU and/or UTU configuration results in a $C_L$ above inviscid levels over the entire linear lift range. The performance of the UTU and LTU configurations is similar at lower angles of attack (i.e., less than about 12°), but the LTU configuration exhibits gradual degradation in lift at higher angles of attack. This drop in lift implies that the slat is adversely affected by the actuation of the ports and its trailing wake is detrimental to the overall flow quality at the main element and the flap. Reversing the flow actuation at the slat, i.e., ingesting fluid at the upper surface of the slat and ejecting fluid at a lower surface of the slat results in a dramatic improvement in lift ($C_{Lmax}$~8.0). FIG. 10 also demonstrates that OFC is again not as effective in increasing lift as continuously ingesting and ejecting fluid through the ports, especially in the linear lift range.

Figure 11B:
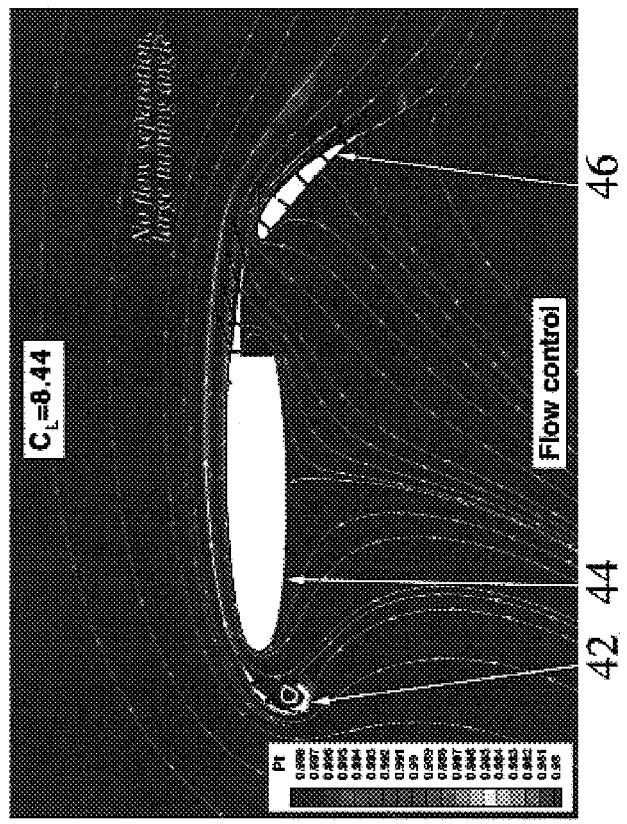
FIG. 11B is an image illustrating a total pressure field over a multi-element aircraft wing according to another embodiment of the present invention.
Figure 11A:
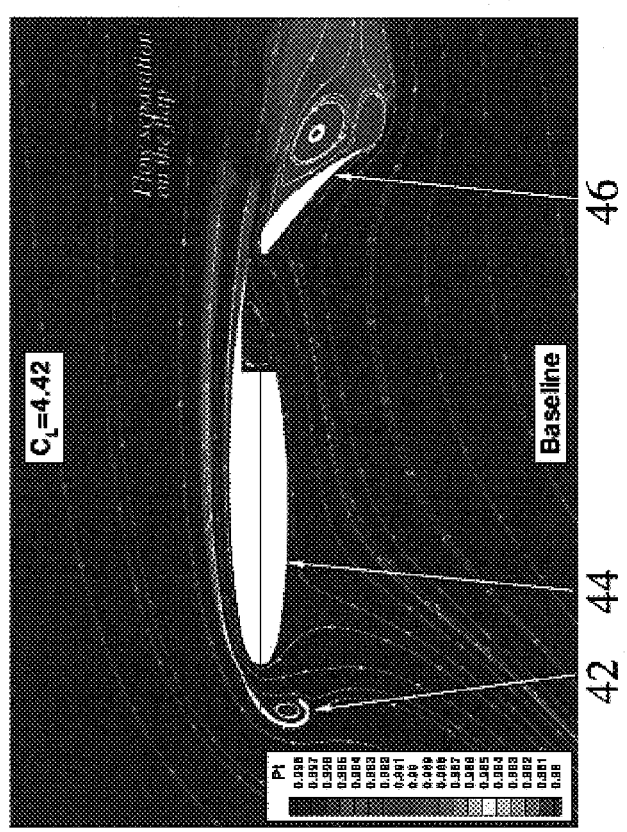
FIG. 11A is an image illustrating a total pressure field over a baseline multi-element aircraft wing.

FIG. 11A illustrates an image of the total pressure field over the multi-element aircraft wing for the baseline configuration ($C_L$=4.42). In FIG. 11B, each of the ports s(1m2m), m(2p3p4p5p), and f(1p2p3p4p5p) are actuated (producing $C_L$=8.44) such that the slat 42 utilizes an UTL actuation, while the main wing element 44 and flap 46 utilize a LTU configuration. Comparison of FIGS. 11A and 11B also demonstrate the more streamlined flow associated with the aircraft wing 40 when compared to the baseline multi-element aircraft wing, especially proximate to the aft portion of the main wing element 44 and flap 46. Flow reversal is eliminated in the wake of the flap 46. Therefore, actuating multiple ports of the aircraft wing 40 in each of the wing elements favorably affects the viscous upper surface layers and the wakes of the slat 42, main wing element 44, and flap 46. The flow becomes streamlined in the flap region with a high turning angle, resulting in stronger circulation on the main wing element 44 and flap 46 and higher lift.

Figure 12A:
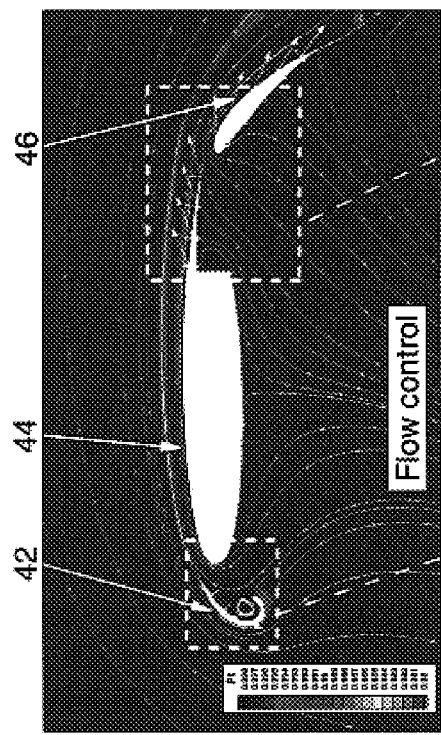
FIGS. 12A-12C are additional images depicting the total pressure field shown in FIGS. 11A-11B.
Figure 12B:
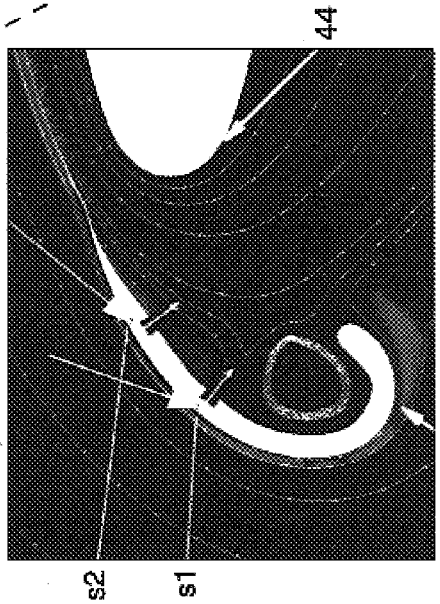
Figure 12C:
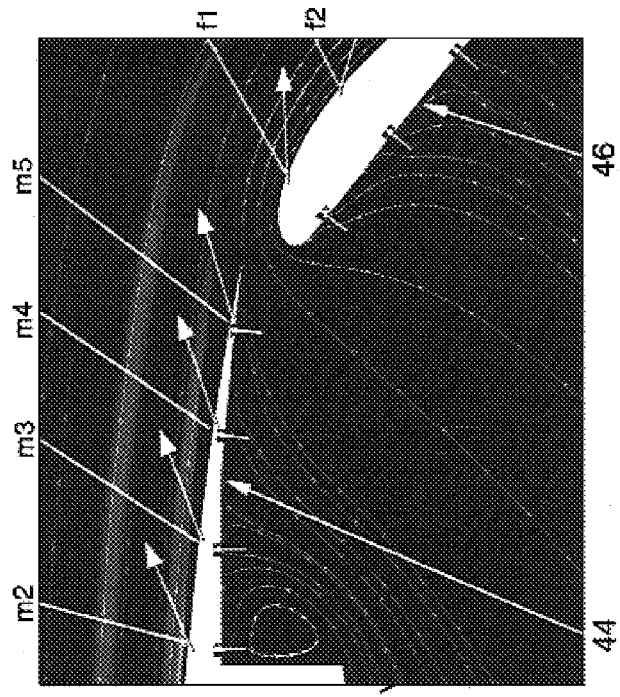

FIGS. 12A-12C illustrate further details of the flow structure over the multi-element aircraft wing 40 shown in FIG. 1B. In particular FIGS. 12B and 12C also show the velocity vectors representing the ingestion and ejection of fluid through the ports s(1m2m), m(2p3p4p5p), and f(1p2p3p4p5p) in each of the slat 42, main wing element 44, and flap 46, respectively.

Embodiments of the present invention provide several advantages. In particular, the multi-element aircraft wing includes fluidic devices and ports for controlling the boundary layer flow over the wing. By locating the ports at critical locations, such as, locations of increased pressure, flow separation, or recirculation, on the aircraft wing and actuating particular ports at predetermined times, the aerodynamic performance of the wing, including lift, may be improved over a wide range of angles of attack. Actuating the ports in the multi-element aircraft wing may result in flow effects normally associated with flaps but with reduced drag and improved stall characteristics. Moreover, the application to the multi-element aircraft wing may mitigate the viscous effects and reduce the incidence of boundary layer separation at critical regions on the wing such that fluid flow may surpass inviscid levels. The ports and fluidic devices may be used to manage loading on the multi-element aircraft In addition, the fluidic devices may employ zero net mass flow such that an external fluid source or complex plumbing is not required.

Moreover, wing load management may be utilized to minimize induced drag at various low speed flight conditions. For example, at take-off and climb the system can be designed to produce a more nearly elliptical span load distribution for lower induced drag. Lower induced drag results in lower engine power requirements which should reduce noise since the engine is the primary source of noise at take-off. Also, lower induced drag leads to smaller engine size for the twin engine class of aircraft. On the other hand, during approach and landing the system can be utilized to produce a more triangular load distribution for higher drag, which is desirable for better aircraft control.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for controlling boundary layer flow over an aircraft wing comprising:
    a plurality of wing elements, wherein the plurality of wing elements comprise a slat and a flap interconnected to a main wing element;
    a plurality of ports defined in the slat, flap, and main wing element, at least a pair of ports in the slat, flap, and main wing element in fluid communication with one another; and
    at least one fluidic device operable to continuously ingest the fluid through at least one of the ports and eject the fluid out of at least one other port to control boundary layer flow of the fluid over the slat, flap, and main wing element.

2. The system according to claim 1, wherein at least one fluidic device comprises an electrically powered pump.

3. The system according to claim 1, wherein at least one fluidic device employs zero net mass flow to regulate fluid flow through the ports.

4. The system according to claim 1, wherein at least one fluidic device is operable to actuate a plurality of ports such that fluid flows through each of the actuated ports simultaneously.

5. The system according to claim 1, wherein at least one fluidic device is operable to actuate a plurality of ports automatically or manually.

6. The system according to claim 1, wherein at least one fluidic device actuates a plurality of ports associated with at least one of the slat, main wing element, or flap.

7. The system according to claim 1, wherein at least one port is defined in an upper surface of at least one of the wing elements.

8. The system according to claim 1, wherein at least one port is defined in a lower surface of at least one of the wing elements.

9. The system according to claim 1, wherein at least one port defined in an upper surface of at least one of the wing elements is in fluid communication with at least one port defined in a lower surface of at least one of the wing elements.

10. The system according to claim 1, wherein at least one port is defined in an aft portion of at least one of the wing elements.

11. A method for controlling boundary layer flow of a fluid over an aircraft wing comprising:
    initiating fluid flow over an aircraft wing comprising a plurality of wing elements, wherein the plurality of wing elements comprise a slat and a flap interconnected to a main wing element; and
    continuously regulating fluid flow over the aircraft wing by ingesting and ejecting fluid through a plurality of ports defined in the slat, flap, and main wine element to control boundary layer flow of the fluid over the slat, flap, and main wing element.

12. The method according to claim 11, wherein initiating comprises initiating take-off or landing of the aircraft.

13. The method according to claim 11, wherein regulating comprises actuating a fluidic device associated with a plurality of ports in fluid communication with one another.

14. The method according to claim 11, wherein regulating comprises regulating a plurality of ports simultaneously.

15. The method according to claim 11, wherein regulating comprises ingesting and ejecting the fluid through a pair of ports defined in an upper surface of at least one of the wing elements.

16. The method according to claim 11, wherein regulating comprises ingesting the fluid through a port defined in a lower surface of at least one of the wing elements and ejecting the fluid through a port defined in an upper surface of at least one of the wing elements.

17. The method according to claim 11, wherein regulating comprises ingesting the fluid through a port defined in an upper surface of at least one of the wing elements and ejecting the fluid through a port defined in a lower surface of at least one of the wing elements.

18. The method according to claim 11, wherein regulating comprises ingesting and ejecting the fluid through a plurality of ports defined in each of the plurality of wing elements.

* * * * *

UNITED STATES PATENT AND TRADEMARK OFFICE
CERTIFICATE OF CORRECTION

PATENT NO.      : 7,635,107 B2  Page 1 of 1
APPLICATION NO. : 11/200515
DATED           : December 22, 2009
INVENTOR(S)     : Shmilovich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,635,107 B2 Page 1 of 1
APPLICATION NO. : 11/200515
DATED : December 22, 2009
INVENTOR(S) : Shmilovich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Eighteenth Day of January, 2011

David J. Kappos
*Director of the United States Patent and Trademark Office*